US005806164A

United States Patent [19]

Wilks

[11] Patent Number: 5,806,164

[45] Date of Patent: Sep. 15, 1998

[54] METHOD FOR DISASSEMBLING A WRITING INSTRUMENT

[76] Inventor: Steven L. Wilks, 1815 Dory La., Irving, Tex. 75061

[21] Appl. No.: 493,760

[22] Filed: Jun. 22, 1995

[51] Int. Cl.[6] .............................. B23P 19/02; B25B 27/14

[52] U.S. Cl. .......................... 29/426.5; 29/441.2; 29/525; 29/275; 29/808; 401/99

[58] Field of Search ................................ 29/426.5, 441.2, 29/525, 324, 282, 275, 434, 234, 808; 401/99, 117

[56] References Cited

U.S. PATENT DOCUMENTS

| | | | |
|---|---|---|---|
| 2,304,521 | 12/1942 | Wuestman | 29/434 |
| 2,896,250 | 7/1959 | Craig | 29/441.2 |
| 3,056,194 | 10/1962 | Kahn et al. | 29/434 |
| 3,099,876 | 8/1963 | Lawless | 29/275 |
| 4,184,243 | 1/1980 | Schroeder et al. | 29/255 |
| 4,190,942 | 3/1980 | Tucker | 29/234 |
| 4,533,271 | 8/1985 | Sansevero . | |
| 4,600,327 | 7/1986 | Guzman . | |
| 4,635,338 | 1/1987 | Walsh | 29/808 |
| 4,786,197 | 11/1988 | Koeln et al. | 401/99 |
| 4,984,346 | 1/1991 | Vorhauer | 29/275 |
| 4,991,988 | 2/1991 | Snell et al. . | |

*Primary Examiner*—David P. Bryant
*Assistant Examiner*—Tisa Stewart
*Attorney, Agent, or Firm*—David W. Quimby; Tom D. Copeland

[57] ABSTRACT

Methods and tools are disclosed for disassembling hand made, high quality writing instruments. Hand made, high quality writing instruments are typically comprised of several different components. The methods and tools allow the individual components of a writing instrument to be disassembled without marring or destroying the components of the writing instrument. The tools for disassembling a hand made, high quality pen comprise a first shaft for removing the pen tip, and a second shaft and spreader for removing the internal mechanism of the pen without destroying the pen's internal mechanism or marring the surface of the pen body.

5 Claims, 6 Drawing Sheets

1
2
3
3'
3, 3'
4
5
6
6'
6, 6'
7
8
9
10
11
12
13
14
15
16
17
18
T 40
34
45
36
38
25
26
24, 24'
23
22, 22'
28
28A
39
31
37
44
35
19

8
9
73, 73'
50
63, 63'
59
73'
73
77
75
55A
55
82
61
86
56
63
63'
57
90
91
93
51

METHOD FOR DISASSEMBLING A WRITING INSTRUMENT

BACKGROUND OF THE INVENTION

1. Field of the Invention

This invention relates to the field of writing instruments, namely, ball point, fountain and rollerball pens and mechanical pencils; and more particularly to instruments of these types that are hand made, usually by hobbyists or craftsmen in this field; and this invention deals with specialized tools for assembly and disassembly of such instruments.

2. Prior Art

Applicant is not aware of any pertinent prior art before the development of his method and apparatus as disclosed herein.

U.S. Pat. No. 4,635,338, issued Jan. 13, 1987 to Wm. H. Walsh, relates to a mechanized procedure for assembling of lead into an automatic pencil.

SUMMARY OF THE INVENTION

A primary object of this invention is to provide a method of disassembly of writing instruments of this type, usually having a wooden exterior, on a metal body, without damaging the body or the wood or any of the structural or functional parts of the instrument.

Another object is to provide a simplistic series of tools to be employed in carrying out the method of this invention.

A further object is to provide a multiple part system of tools to be used in the disassembling of a series of pens, pencils and the like, that may be used with a variety of turning kits employed by craftsmen in producing handsome bodied pens from natural or man-made materials; a "turning kit" being the functional parts necessary to make a complete wooden bodied pen or pencil when the wood part of the body has been "turned" on a lathe.

A further object is to provide a multiple part system of tools to be used in the disassembling of a series of pens, pencils and the like, that may be used with a variety of turning kits employed by craftsmen in producing a handsome wood or other material writing instrument.

BRIEF DESCRIPTION OF THE DRAWINGS

FIG. 1 is an exterior view of a ball point pen that may be assembled and disassembled using the tools of this invention;

FIG. 2 is an exploded view of the component parts of the ball point pen of FIG. 1;

FIG. 3 is a tool kit comprising the tools to be used in assembling and disassembling the pen of FIG. 1, and similar writing instruments; wherein:

FIG. 3A is the rod tool of FIG. 3;

FIG. 3B is the shaft tool of FIG. 3;

FIG. 3C is a side view of the spreader tool of FIG. 3;

FIG. 3D is an end view of the spreader tool of FIG. 3C;

FIG. 4 is a view of the rod tool of FIG. 3A inserted into a portion of the pen, preparatory to removal of the pen tip;

FIG. 5 is a view of the shaft tool of FIG. 3B inserted into the cap body, preparatory to removal of the clip cap;

FIG. 6 is a partial cross-section view showing a method step in the disassembly process, wherein a mark is placed on the shaft tool of FIG. 3B for future reference;

FIG. 7 is an "X-ray" view of the pen of FIG. 1, showing the assembled parts in place prior to disassembly;

DESCRIPTION OF THE PREFERRED EMBODIMENTS

Figures 1, 2, 3, 3A, 3B, 3C, 3D, 4, 5, 6, 7:
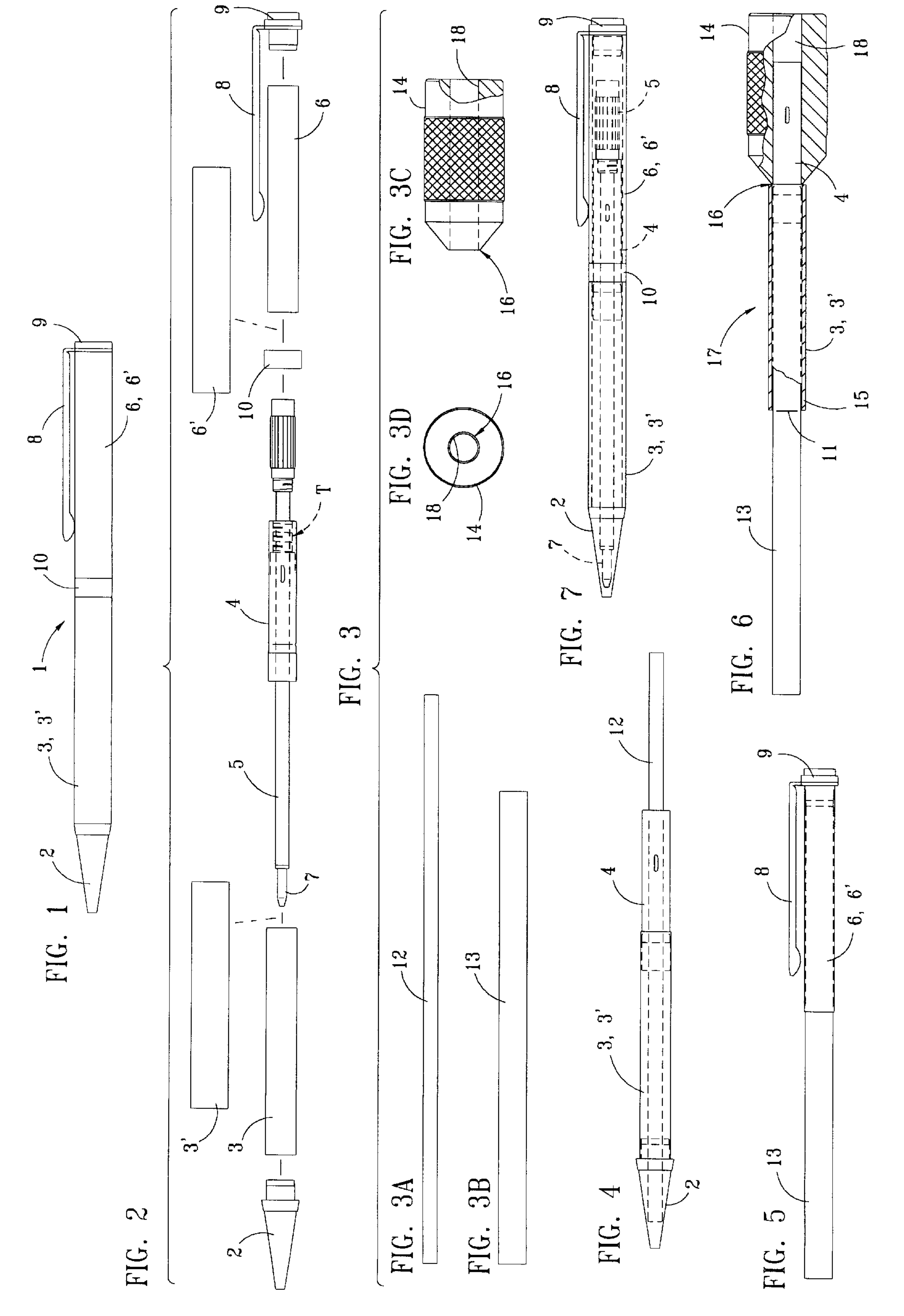

Referring now more particularly to the characters of reference in the drawing, it will be observed in FIGS. 1 and 2 that the complete ball point pen assembly 1, comprises a pen tip 2 attached to the forward end of pen body 3, which includes a mechanism 4 for holding a refill unit 5, which is partly received in cap body 6 for adjusting the location of the ball point 7 of refill 5. Cap body 6 includes a clip 8 and a clip cap 9 at the upper end of pen 1, and a middle ring 10. Wooden sleeves 3' and 6' are glued to the brass tubes of the pen body 3 and cap body 6 respectively to complete the parts of the pen of this embodiment.

The tool kit, indicated in FIG. 3 and comprising the tools of FIGS. 3A–D, is used for assembly and disassembly of the pen 1. The tool kit comprises a rod 12, a shaft 13, and a spreader 14, each of which are employed in certain steps of the following disassembly method and procedure:

In Step One, the cap body 6, middle ring 10, and refill 5 are all removed from pen assembly 1 and set aside. Refill 5 (a purchased part) unscrews from mechanism 4 via matching threads T as shown in FIG. 2.

Step Two, insert rod 12 into mechanism 4, as if it were refill 5, until it contacts pen tip 2, as shown in FIG. 4.

Step Three, firmly grasp the pen body 3, and with a hammer, tap the exposed end of rod 12 to remove the pen tip 2 (glued tips require a few more taps).

Step Four, insert shaft 13 into open end of cap body 6, as shown in FIG. 5, firmly grasp cap body 6, and hammer tap exposed end of shaft 13 to remove clip cap 9 and clip 8.

Step Five, with pen tip 2 and cap body 6 removed, insert shaft 13 into (former) tip end 15 of the pen body 3, until it engages one end of mechanism 4.

Step Six, insert the other end of mechanism 4 into the tapered end rim 16 and hole 18 of spreader 14, as shown in FIG. 6, making sure that no wood of the pen body sleeve 3' contacts the rim 16 of spreader 14; at this point the shaft 13 should be scribed as noted at 11 in FIG. 6, to provide a "depth gage" for future reference at re-assembly.

Figures 8, 9, 10, 10A, 11, 12, 13, 14, 15, 16, 17, 18, 47, 48:
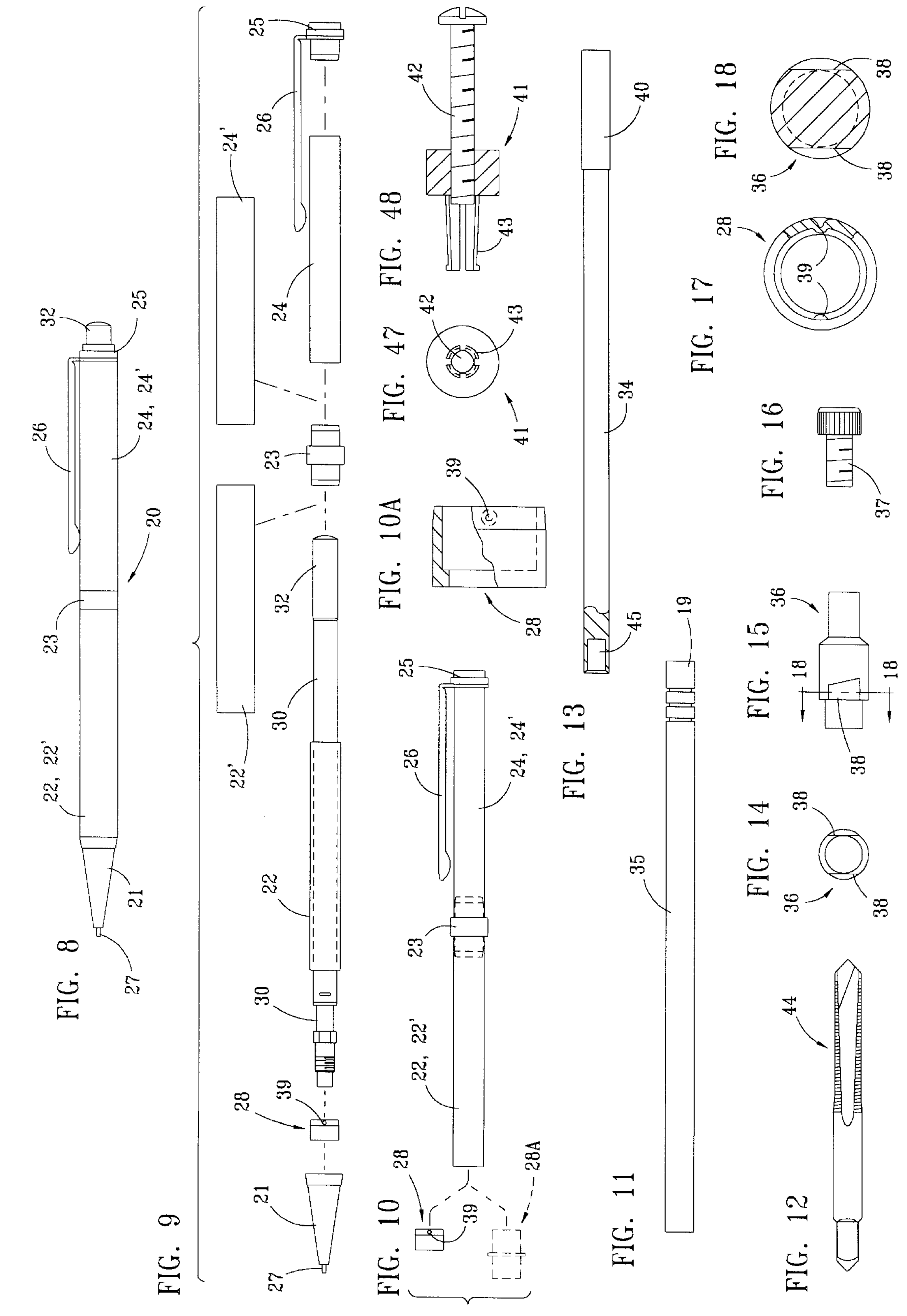
FIG. 8 is an exterior view of a typical automatic/mechanical pencil that may be assembled and disassembled by the process and/or using the tools of this invention.
FIG. 9 is an exploded view of the pencil of FIG. 8, and showing the component parts thereof.
FIG. 10 is an outline view of a portion of the pencil of FIG. 8, and showing alternate keepers that may be employed.
FIG. 10A is an enlarged side view partly in section of the flush keeper of FIG. 10.
FIG. 11 is an outline view of the shaft tool of the pencil tool kit used herein.
FIG. 12 is a view of the tap tool used herein.
FIG. 13 is an outline view of the keeper rod tool used herein.
FIG. 14 is an end view of the keeper point tool of the pencil tool kit of this invention.
FIG. 15 is a side view of the keeper point tool of the pencil tool kit.
FIG. 16 is a side view of the cap screw tool of the pencil tool kit used herein.
FIG. 17 is an enlarged end view of the topmost keeper of FIG. 10.
FIG. 18 is a section view taken at lines 22—22 of the keeper point tool of FIG. 15.
FIG. 47 is an end view of the pencil cap remover.
FIG. 48 is a side view of the pencil clip remover (PCR) tool of this invention.

Step Seven, place entire sub-assembly 17 of shaft 13, body 3, mechanism 4 and spreader 14, selectively into a vise, as shown in FIG. 8 or into a quick-grip clamp, as shown in FIG. 9, and tighten slowly to press mechanism 4 from pen body 3, through the central opening 18 of spreader 14.

At the appropriate point, if desired, the wood sleeves 3' and 6' that are glued to the brass tubes of the pen body 3 and cap body 6, may be refinished or removed by turning on a lathe, or scraping and making the brass tubes ready to accept new pieces of wood, or other decorative material.

It is essential when using the spreader tool 14, that the pen body 3 contact the circular end portion 16, and that no part of the wooden sleeve 3' touch this rim 16, to prevent cracking or other damage to the wood when removing the mechanism 4.

For reassembly, the following steps are used:

Step One, insert mechanism 4 into pen body 3 using a vise or quick grip, inserting the mechanism deeper into the pen body than the desired working depth; and insert the other end of the mechanism into the tapered end of spreader 14.

Step Two, insert shaft 13 into open end of pen body 3, and place the end of the shaft and the end of the spreader 14 between the jaws of a vise or quick grip. Slowly apply pressure with the vise or quick grip to the end of the shaft 13 and the end of the spreader 14, driving the shaft farther into the pen body 3, thus pushing the mechanism 4 to a desired working depth in the pen body. When the scribed "depth gage" mark 11 on the shaft 13 is at the end of pen body 3, as shown in FIG. 6, stop applying pressure because the mechanism 4 is at the desired working depth. Remove the shaft 13 and other tools from the vise or quick grip and remove the shaft from the pen body 3.

Step Two, insert shaft 13 into open end of pen body 3, until the "depth gage" mark is reached to properly locate mechanism, and then remove shaft 13.

Step Three, insert pen tip 2 into pen body 3, using vise or quick-grip clamp to press pen tip 2 into place in pen body 3.

Step Four, reassemble pen body 3 with mechanism 4 and refill 5 into cap body 6, manually, or with the aid of vise or clamp as noted in Exhibit A.

Step Five, reverse the disassembly process for re-assembling any parts not specifically called out above.

Certain precautions need to be observed when assembling or disassembling writing instruments or this type, namely:

Always wear proper eye protection when using a hammer;

Cover one end of rod 12, and one end of shaft 13, with a piece of tape, and always hammer on the taped ends only;

Do not use hammer directly on tapered end of spreader 14.

Turning now to the disassembly and reassembly of the pencil of FIG. 8, refer to FIGS. 8–26.

FIG. 8 shows the complete pencil 20 to be comprised of a pencil tip 21, a lower body 22, 22', a middle connector 23, an upper or cap body 24, 24', a clip connector 25 and a clip 26. The outer portion of the bodies indicated at 22' and 24' are of a high grade and handsome appearing wood, such as "Dymond" wood or other decorative material that is usually turned on a lathe, and probably accounts for the term "turning kit" that applies to the metal parts of the writing instrument components shown in this specification, that are necessary to build a complete writing instrument.

In the exploded view (FIG. 9) of the pencil 20, the detail components thereof are seen as the pencil tip 21 with a lead guide 27 extending therefrom, an internally located keeper 28, or 28A (shown in phantom in FIG. 10), a pencil mechanism 30 which extends completely thru the lower body tube 22, middle connector 23 and upper or cap body tube 24, until the lead activator and eraser cap 32 projects thru clip connector 25.

The tool kit, used for assembly and disassembly, comprises keeper rod 34, shaft 35, keeper point 36, cap screw 37, and tap 44, each of which tools are employed in the following disassembly method:

In Step One, unscrew the pencil point or tip 21, and remove pencil mechanism 30. The pencil body, or lower tube 22 end has either a flush keeper 28, or an alternate extended keeper 28A as seen in FIG. 10. For the flush keeper 28, insert keeper point 36 into the blind hole 45 of keeper rod 34, and insert rod and point into pencil 20 as seen in FIG. 19, making sure that keeper point 36 extends slightly from the end of the flush keeper 28, as seen in FIG. 21; if not, rotate until the flats 38 on the keeper point 36 align with dimples 39 on the keeper 28, shown in FIGS. 14, 15 and 16.

Figures 19, 20, 21, 22, 23, 24, 25, 26:
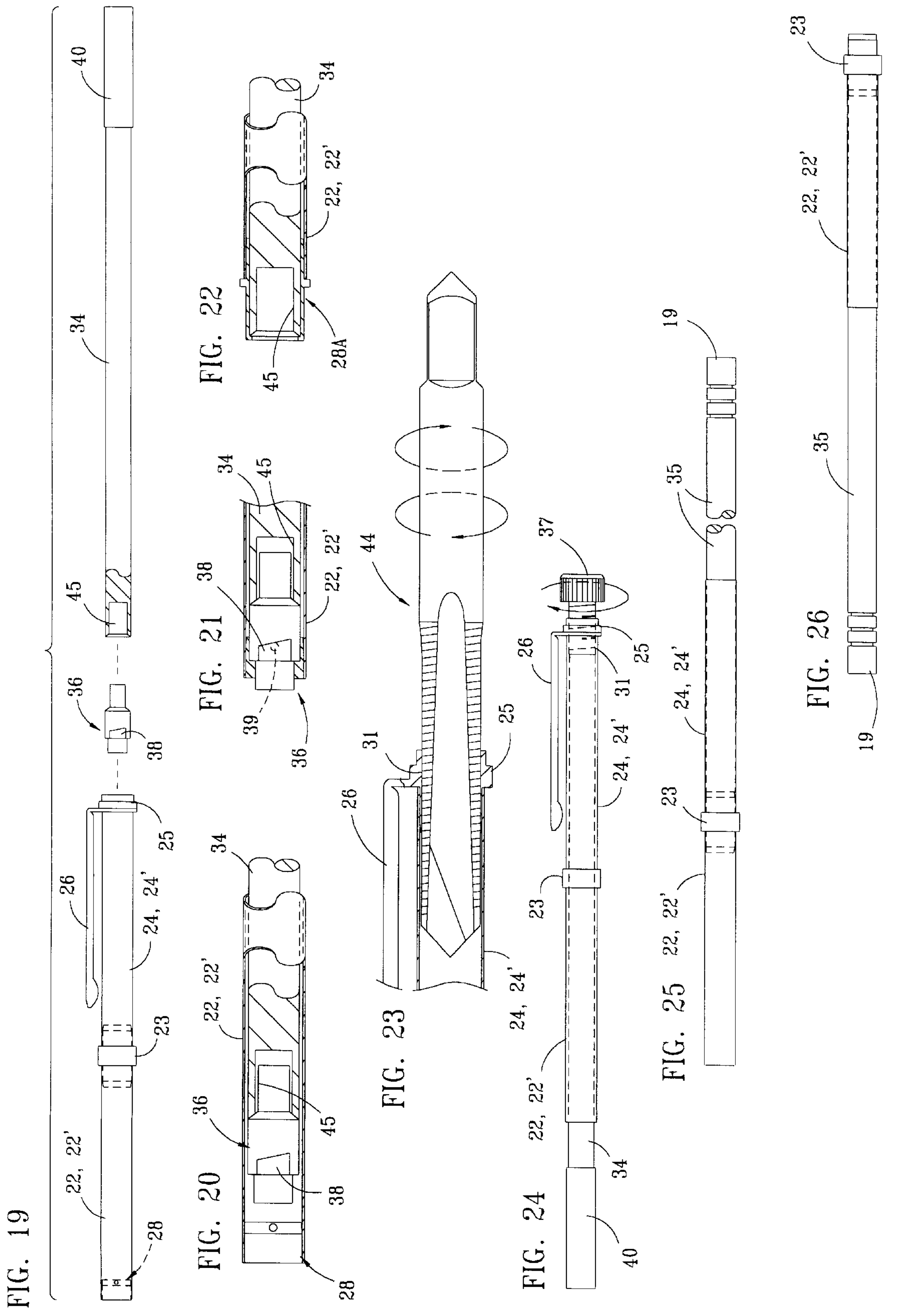
FIG. 19 illustrates the use of the keeper rod tool to insert the keeper point into a mechanical pencil.
FIG. 20 is a sectional view showing the keeper point being inserted if the lower tube of the pencil of FIG. 19.
FIG. 21 is a sectional view of the keeper point fully engaging the keeper shown in FIG. 20.
FIG. 22 is a sectional view of the alternate keeper shown in FIG. 10, prior to its removal from the lower tube of the pencil of FIG. 8.
FIG. 23 is a partial section of the upper tube and clip connector showing the tap tool cutting a thread in the clip connector.
FIG. 24 shows the cap screw tool being threaded into the tapped top of the pencil of FIG. 23, with the keeper rod tool inserted into the other end of the pencil.
FIG. 25 shows the shaft tool inserted into the upper tube of the pencil in preparation for the separation of the upper and lower tubes.
FIG. 26 shows the shaft tool inserted into the lower tube of the pencil in preparation for removal of the middle connector.

In Step Two, for the extended type alternate keeper 28A, insert the keeper rod 34 fully into the keeper 28A in the manner indicated in FIG. 22.

In Step Three, grasp the lower tube 22 and hammer tap the exposed end 40 of keeper rod 34 until the keeper point 36 and keeper 28A are removed from the lower tube 22; then remove keeper rod 34.

In Step Four, insert tap tool 44 into the clip connector 25 and, as shown in FIG. 23, using a wrench turn the tap clockwise until approximately ½" of thread is visible on the top of tap 44. This action provides a thread 31 on the inside of the clip connector 25.

In Step Five, remove the tap 44 and insert cap screw 37 fully; then insert the keeper rod 34 into the opposite end until it contacts the bottom of the cap screw 37 as shown in FIG. 24, then hammer tap on the exposed end 40 of keeper rod 34 until the clip connector 25 and cap screw 38 are removed from upper tube or cap body 24; then remove the keeper rod 34, and cap screw 37.

An alternate to Steps Four and Five is the use of pencil clip remover (PCR) 41, as shown in FIGS. 47 and 48, insert pencil clip remover into clip connector 25. Turn screw 42 on pencil clip remover 41 to expand the grippers 43 inside of clip connector 25, using keeper rod 34, hammer out clip connector. Unscrew screw on PCR to relax fit of grippers 43 on a ridge (not shown) inside of clip cap 25, and remove PCR 41.

In Step Six, insert shaft 35 into the upper tube 24 as noted in FIG. 25, until it contacts the middle connector 23, then grasp the upper tube 24 and hammer tap on the end 19 of shaft 35 until the upper tube 24 is separated from the middle connector 23.

In Step Seven, insert shaft 35 into the lower tube 22 until it contacts the middle connector 23, as shown in FIG. 26, and then hammer tap the exposed end 19 of shaft 35 until the middle connector 23 is separated from the lower tube 22.

At this point any defective components may be replaced, and the pencil reassembled by basically reversing the foregoing disassembly steps.

Figures 27, 28, 29, 30, 49, 50, 51:
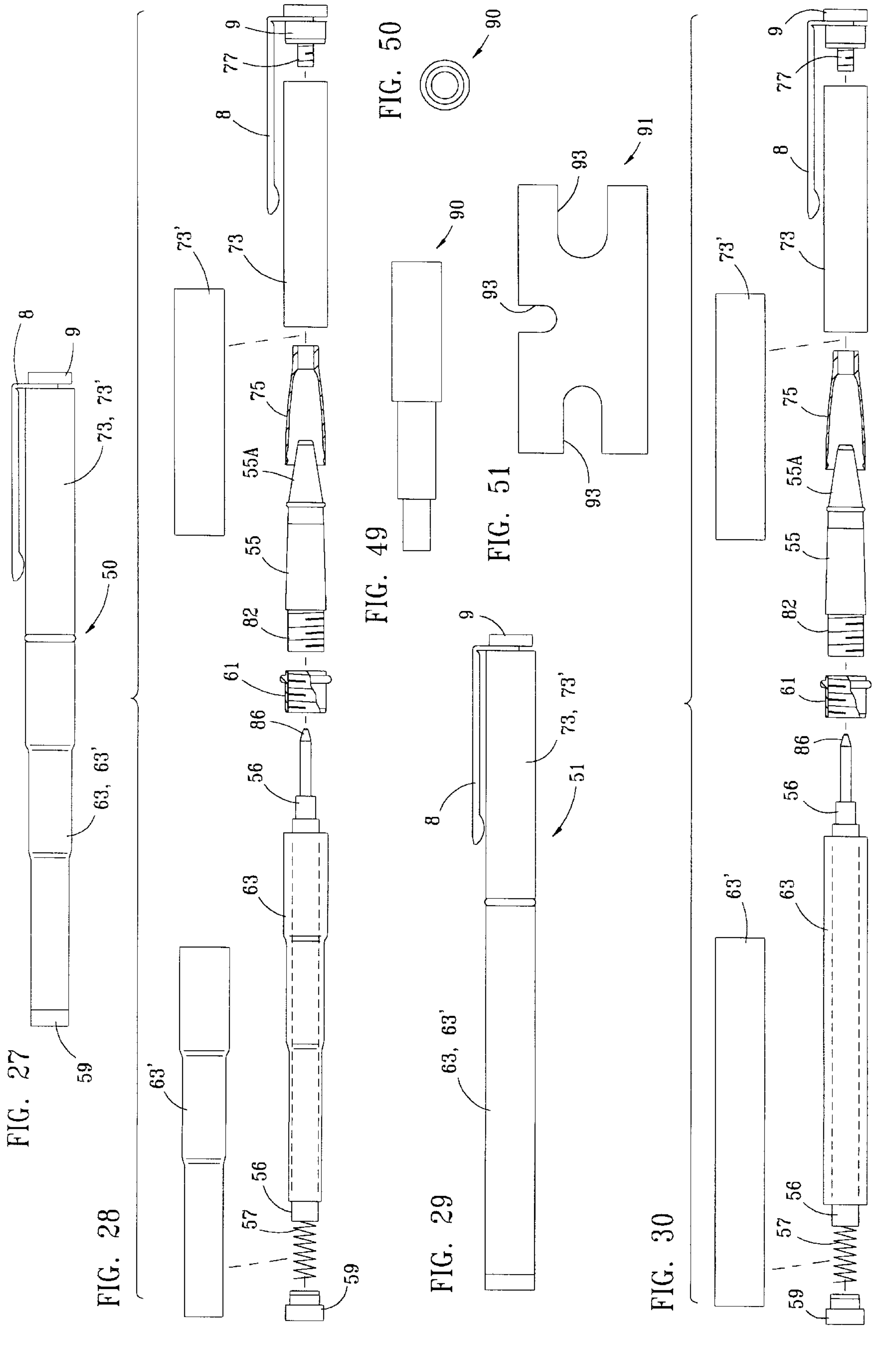
FIG. 27 is an outline view of an assembled rollerball pen.
FIG. 28 is an exploded view of the pen of FIG. 27.
FIG. 29 is an outline view of a fountain pen.
FIG. 30 is an exploded view of the pen of FIG. 29.
FIG. 49 is a side view of the stepped shaft tool used to disassemble certain component parts.
FIG. 50 is an end view of the tool of FIG. 49.
FIG. 51 is a backing plate tool to supplement the action of the tool of FIG. 49.
Figure 31:
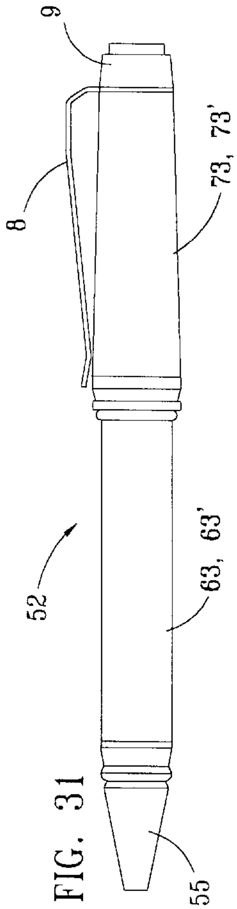
FIG. 31 is a ball point pen known by the name of "Fat Pen"
Figure 32:
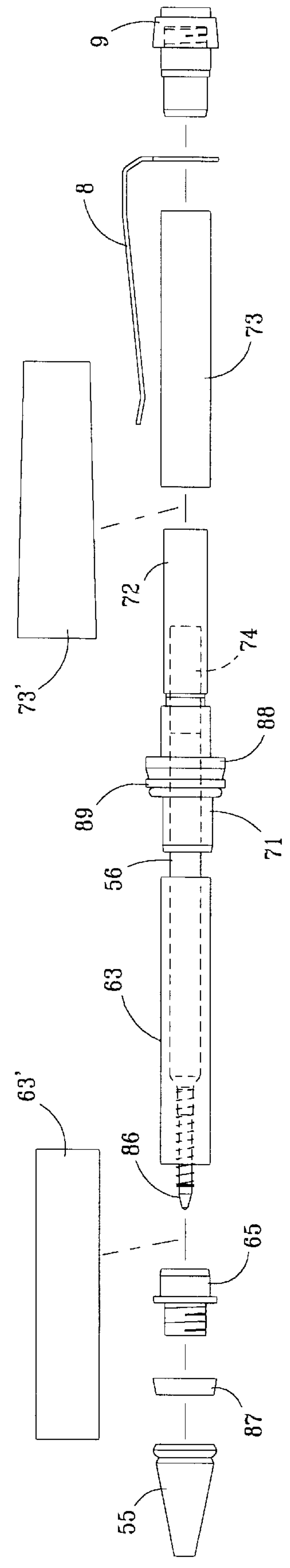
FIG. 32 is an exploded view of the pen of FIG. 31.
Figure 33:
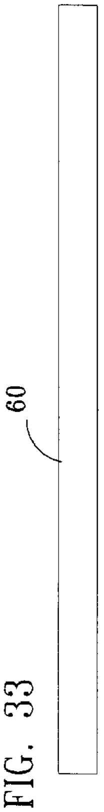
FIG. 33 is an outline view of the shaft tool used with the pens of FIGS. 27, 29 and 31.
Figure 34:
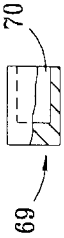
FIG. 34 is the "plug with hole" tool used herein.
Figure 35:
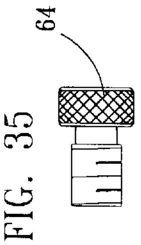
FIG. 35 is a thumb screw used with the tools of FIGS. 33 and 34.
Figure 36:
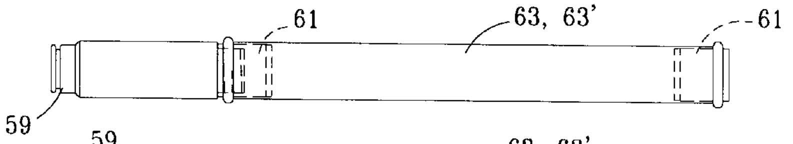
FIG. 36 is a view of the main pen body and threaded coupler of the one style of pen referenced herein.
Figure 37:
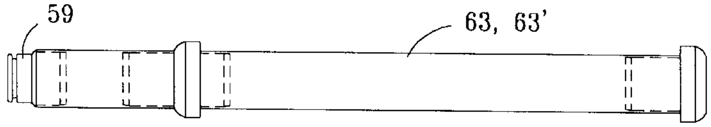
FIG. 37 is a view similar to FIG. 36, of the Rollerball Pen style.

Turning now to FIGS. 27–35 of the drawing, the pens known as Rollerball 50, Fountain Pen 51 and Fat Pen 52 are disclosed in outline form respectively in FIGS. 27, 29 and 31. The tools for disassembly of these pens are shown in FIGS. 33–35.

Regardless of which style pen is involved, the concept of disassembling is still the same, and as follows:

Step One, remove the point assembly 55 (including NIB section 55A, if separate), the refill 56 and the spring 57.

Step Two, for styles with double threaded couplers 61, unscrew the end/finale 59 and skip to Step Four.

Figure 38:
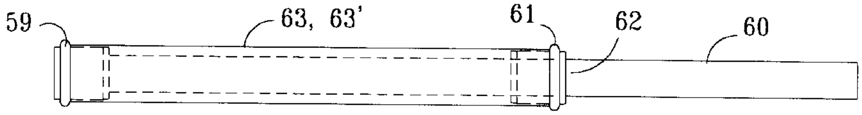
FIG. 38 is an outline view showing a shaft tool in one process step of removal of the end/finale of certain pen styles.

Step Three, insert shaft tool 60 into the threaded coupler 61, and open end 62 of the main pen body 63, until shaft 60 touches the end/finale 59, as shown in FIG. 38. Grasp the pen body firmly and with a hammer, tap on the end of shaft 60 until the end/finale 59 is removed. Then remove shaft 60.

Figure 39:
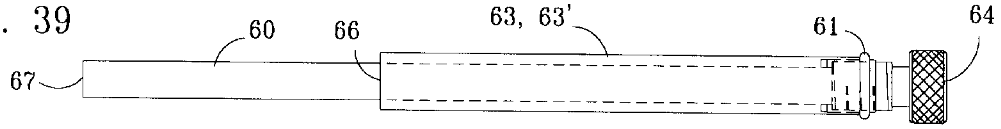
FIG. 39 is an outline view showing the process step of removing a threaded coupler from the pens herein.

Step Four, thread the thumb screw 64 (of FIGS. 35 and 39) into the threaded coupler 61 until tight; then insert shaft 60 into other end 66 of the pen body 63; grasp pen body firmly, and hammer tap on end 67 of shaft 60 until the threaded coupler 61 is removed (along with cap screw 64). For styles with double couplers, remove thumb screw 64 from the coupler 61, and repeat this procedure on the remaining coupler, not shown.

Figure 41:
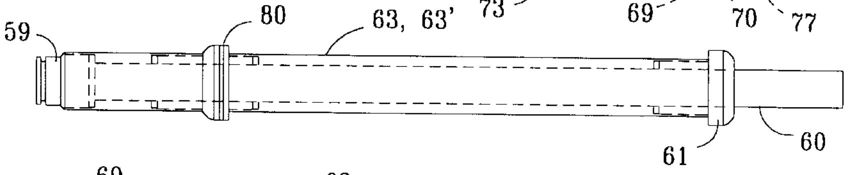
FIG. 41 illustrates a process step in the removal of the end/finale component from certain pen bodies.
Figure 42:
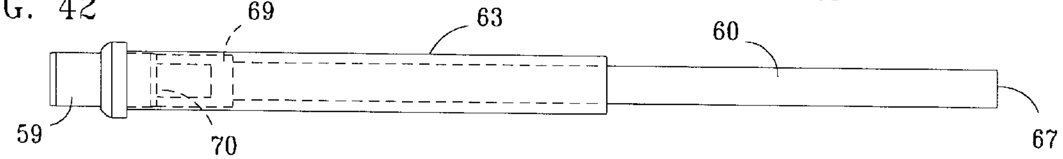
FIG. 42 illustrates the utilization of the "plug with hole" tool for removing the end/finale of a pen.
Figure 43:
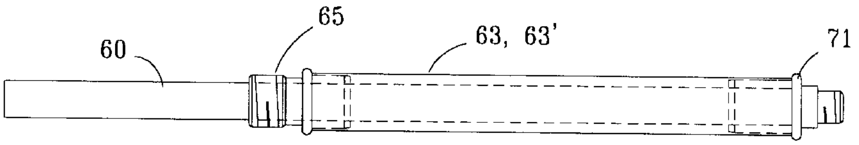
FIGS. 43–46 represent other uses of the shaft tool in the disassembly process of this invention.
Figure 44:
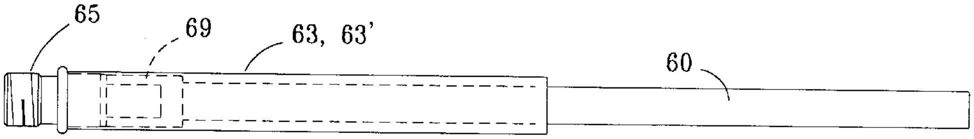
Figure 45:
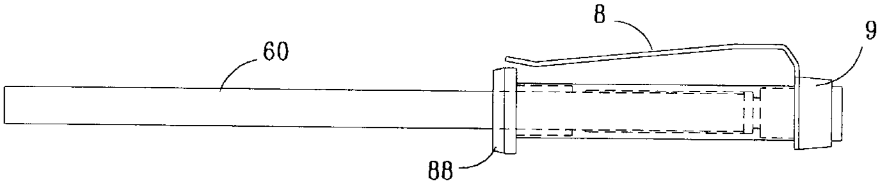
Figure 46:
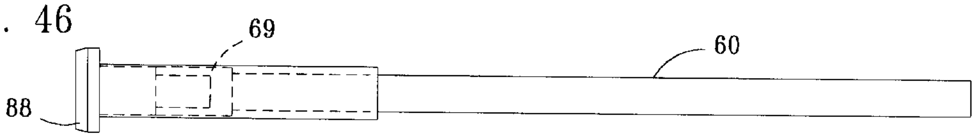

Step Five, for pens like shown in FIG. 41, where the end/finale 59 is pressed on instead of screwed on, follow procedure of steps 3 and 4 and, once the threaded coupler is removed, insert plug 69 with hole end 70 making contact with connector 59A, as shown in FIG. 42, grasp the pen body 63 firmly and with hammer, tap the exposed shaft end 67 (after tape applied) until connector 59 is removed.

Figure 40:
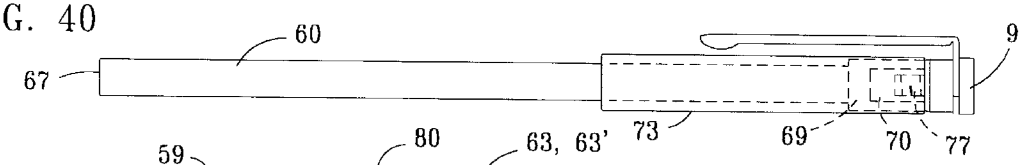
FIG. 40 illustrates another process step in removing components from the pens herein described.

Step Six, referring to FIGS. 28, 30 and 40, to finish the cap portion 73 of pen 50/51, the white plastic cup piece 75 is removed, and using the tools of kit 53, insert plug 69 so that the hole end 70 covers the threads 77 of clip assembly 9, then insert shaft 60 into the cap body 73; grasp cap body firmly, and with hammer, tap on exposed and wrapped end 67 of shaft 60 until the cap assembly 9 is removed using the procedure shown in FIG. 40.

Step Seven, for pens like that shown in FIG. 41, there is a large gold ring/band which requires the use of stepped shaft tool 90 of FIG. 49 to remove the brass tube component from the gold ring component of Mt. Blanc© and various Parker© style kits.

Due to the nature of the mechanical connection involved with the "gold ring" component this component is usually the hardest to salvage. The steps are so designed that OD and ID of respective kits match. This matching insures transfer of force to brass tube component for removal. Various OD's may apply to the brass tube, material, gold ring component connection, insuring clean break from gold ring component minimizing cleanout.

Backing plate 91 of FIG. 51 is designed to back support the "gold ring" component for removal; holes/slots 93, with access to outer perimeter, of varying diameter allow brass tube component to be slid into place and providing proper area of support. The number of holes/slots and their allowable sizes will be that of known dimensions of today's kits. Enough room on backing plate will allow for future sizes to be added, and may be added by user for user use only. Backing plate thickness may vary, however, optimum thickness will be used to maintain true disassembly performance.

Referring now to FIGS. 21 and 28, the rollerball pen 50 is seen to comprise a main pen body 63, which in this instance is a brass tube having three linear stepped down sections, and a point assembly 55 (including NIB section 55A), that slides into a white plastic cup piece 75 simultaneously with its being seated into cap portion 73. Prior to final assembly (as shown in FIG. 28), a handsome wood cap sleeve 73' and stepped wood sleeve 63' are glued onto and over cap body 73 and pen body 63 respectively. Between pen body 63 and point assembly 55, a coupler 61 is pressed into pen body 63 and is threaded onto threads 82 of point assembly 55. A plug finale 59 is pressed against spring 57 and onto body 63 to seat the refill 56 into its location in pen assembly 50, with its ball point tip 86 extending beyond the nib section 55A on final assembly; so in use, the ball point tip 86 is exposed and ready for use under normal writing pressure, but it retreats against the pressure of spring 57 when heavy pressure is placed on the pen tip 86. Clip 8 and clip cap 9 complete the assembly of pens 50 and 51 of FIGS. 27–30.

The writing instrument affectionately referred to as the "Fat Pen" is indicated at 52 in FIGS. 31 and 32, while its tool kit for assembly and disassembly is shown in FIGS. 33–35 to comprise shaft tool 60, plug with hole 69 and thumb screw 64. The fat pen 52 is seen to comprise the following components in FIGS. 31 and 32; pen body 63, cap portion 73, clip 8 and clip cap 9; in this pen the handsome wood sleeve 73' is tapered to conform to the fat pen style.

While the structural content of the plurality of different writing instruments disclosed herein, the concept of the function of the disassembler members and the tool kits employed is basically the same, and certain different structural parts bear the same reference numerals to indicate their functions are comparable, and no claims are made herein to any of the writing instruments, per se.

To further disclose this invention, there is attached hereto and made a part of this specification, an Exhibit A provides owner instructions for the use of the disassembler and the tool kits disclosed herein as three sheets of data and instructions.

Exhibit B attached hereto is a summary of identification of reference numerals and their corresponding elements in the drawing.

From the foregoing description and examples, it will be seen that there has been produced a writing instrument disassembler and tool kit, and a method of using same that substantially fulfills the objects of this invention, as set forth herein. These inventions are not limited to the examples shown herein, but may be made and performed in many ways within the scope of the appended claims:

What is claimed is:

1. A writing instrument disassembly method comprising the steps of:

a) providing a writing instrument having a body, a tip press fit into one end of the body, an internal mechanism press fit into an opposite end of the body, a refill threaded into said internal mechanism, a cap and a cap clip press fit into said cap;

b) gripping the writing instrument about said body;

c) gripping said cap and manually separating said body from said cap to expose an end of said internal mechanism;

d) unscrewing said refill from said internal mechanism;

e) removing said refill from said body;

f) gripping said body while inserting an end of a first shaft into said body and contacting said tip with the end of said first shaft;

g) applying a force to an opposite end of said first shaft thereby removing said tip from said body;

h) removing said first shaft from said body;

i) inserting a second shaft into an opposite end of said body to contact an end of said internal mechanism, said second shaft having a diameter larger than an inside diameter of said internal mechanism and slightly smaller than the diameter of said body;

j) placing the exposed end of said internal mechanism in a tapered end of a spreader;

k) sliding said internal mechanism into said spreader until the tapered end of said spreader contacts said body; and l) applying a force to said spreader and said second shaft to push said internal mechanism out of said body and into said spreader, thereby disassembling the writing instrument.

2. The writing instrument disassembly method of claim 1 wherein said spreader comprises a spreader body; a bore through the spreader body, said bore sized to allow said internal mechanism of said writing instrument to slide within said bore; and a tapered end, wherein said tapered end terminates short of said bore to leave a circular rim around said bore for the purpose of abutting a metallic portion of said body of the writing instrument while said circular rim does not contact any non-metallic portion of the writing instrument body.

3. The writing instrument disassembly method of claim 1 further comprising:

m) inserting the second shaft into the cap until a first end of said second shaft contacts the cap clip and a second end of said second shaft remains exposed from said cap;

n) gripping the cap; and o) applying a force to the exposed end of said shaft to separate the cap clip from the cap.

4. The writing instrument disassembly method of claim 1 further comprising marking the second shaft where the second shaft enters the body after step i).

5. The writing instrument disassembly method of claim 4 wherein said writing instrument is reassembled subsequent to disassembly, the reassembly steps comprising:

m) replacing or repairing any defective writing instrument parts;

n) inserting the internal mechanism into the body;

o) pressing said internal mechanism into said body so that said marking on the second shaft is exposed when the second shaft is inserted into said body against said internal mechanism;

p) inserting said second shaft into the body until said second shaft contacts said internal mechanism;

q) inserting an exposed end of said internal mechanism into said spreader;

r) applying a force to said second shaft and said spreader until the marking on said second shaft is positioned where the second shaft enters the body, thus properly positioning said internal mechanism;

s) removing said second shaft from the body;

t) pressing said tip into said body;

u) removing said spreader from said internal mechanism; and v) replacing said refill.

* * * * *